(12) United States Patent
Shimizu et al.

(10) Patent No.: US 12,147,207 B2
(45) Date of Patent: Nov. 19, 2024

(54) SCADA WEB HMI SYSTEM AND HMI CLIENT

(71) Applicant: Toshiba Mitsubishi-Electric Industrial Systems Corporation, Tokyo (JP)

(72) Inventors: Ryo Shimizu, Tokyo (JP); Akira Nojima, Tokyo (JP); Nobuo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 0 days.

(21) Appl. No.: 17/754,766

(22) PCT Filed: Jun. 1, 2020

(86) PCT No.: PCT/JP2020/021622
§ 371 (c)(1),
(2) Date: Apr. 12, 2022

(87) PCT Pub. No.: WO2021/245752
PCT Pub. Date: Dec. 9, 2021

(65) Prior Publication Data
US 2024/0295862 A1    Sep. 5, 2024

(51) Int. Cl.
*G05B 19/042*   (2006.01)
*G06F 9/54*   (2006.01)
*G06F 13/00*   (2006.01)

(52) U.S. Cl.
CPC .. *G05B 19/042* (2013.01); *G05B 2219/24215* (2013.01)

(58) Field of Classification Search
None
See application file for complete search history.

(56) References Cited

U.S. PATENT DOCUMENTS

| | | | | |
|---|---|---|---|---|
| 11,644,810 B2 * | 5/2023 | Fujieda | ............... | G06F 3/147 345/520 |
| 2009/0089225 A1 * | 4/2009 | Baier | ............... | G06Q 10/06 706/12 |
| 2022/0171361 A1 * | 6/2022 | Ueki | ............... | G05B 19/05 |

FOREIGN PATENT DOCUMENTS

| | | | | |
|---|---|---|---|---|
| CA | 3062745 A1 * | 6/2018 | ......... | G06F 16/258 |
| EP | 3629172 A1 | 4/2020 | | |

(Continued)

OTHER PUBLICATIONS

Bin Qiu et al. Internet-Based SCADA Display System (Year: 2002).*

(Continued)

*Primary Examiner* — Curtis A Kuntz
*Assistant Examiner* — Jerold B Murphy
(74) *Attorney, Agent, or Firm* — XSENSUS LLP

(57) ABSTRACT

A web browser (5) makes a communication thread (7) and a DOM update thread (6) run in parallel. The communication thread (7) overwrites, when signal data having the same unique identifier as received signal data already exists in a buffer area, the signal data stored in the buffer area with the received signal data. When receiving a signal data request event from the DOM update thread (6), the communication thread (7) transmits all signal data stored in the buffer area to the DOM update thread (6). The DOM update thread (6) updates a DOM for all the signal data. The DOM update thread (6) transmits, after updating the DOM, the signal data request event to the communication thread and updates, according to the updated DOM, a display content of a display part displayed on the web browser (5).

4 Claims, 14 Drawing Sheets

(56) References Cited

FOREIGN PATENT DOCUMENTS

| | | | |
|---|---|---|---|
| JP | 2017-27211 | A | 2/2017 |
| JP | 6552775 | B1 | 7/2019 |
| KR | 20200088099 | A * | 7/2020 |

OTHER PUBLICATIONS

Human Machine Interfaces Based on Open Source Web-Platform and Opc Ua (Year: 2019).*
Scada Systems Architecture Based on OPC and Web Servers and Integration of Applications for Industrial Process Control (Year: 2018).*
Google Search String (Year: 2024).*
Water Distribution Network Real-Time Simulation Based on SCADA using OPC Communications (Year: 2011).*
Web Based SCADA Display System (Year: 2000).*
KR-20200088099-A English Language Translation (Year: 2020).*
Office Action issued on Feb. 12, 2024, in corresponding Indian patent Application No. 202117055898, 6 pages.
International Search Report and Written Opinion mailed on Sep. 1, 2020, received for PCT Application PCT/JP2020/021622, Filed on Jun. 1, 2020, 8 pages including English Translation.

* cited by examiner

```
{
 "signal_value": 3.25,
 "data_type": "integer",
 "corresponding_parts":
 [
  {
   graphic_id: "G1",
   part_id: 35
  },
  {
   graphic_id: "G1",
   part_id: 36
  },
  {
   graphic_id: "G2",
   part_id: 10
  }
 ]
}
```

FIG. 4

DOM UPDATE THREAD IS STOPPING

DOM UPDATE THREAD IS RUNNING

| DATA TYPE | GRAPHIC ID | PART ID | SIGNAL VALUE |
|---|---|---|---|
| short | G1 | 1 | 254 |
| | | 2 | 256 |
| | | 3 | 312 |
| | | 4 | 234 |
| | G2 | 1 | 34 |
| | | 2 | 36 |
| | | 3 | 42 |
| | | 4 | 56 |
| float | G1 | 1 | 2.345 |
| | | 2 | 3.123 |
| | G2 | 1 | 4.213 |
| | | 2 | 0.453 |
| boolean | G1 | 1 | true |
| | G2 | 1 | false |
| | | 2 | false |

FIG. 9

SCADA WEB HMI SYSTEM AND HMI CLIENT

CROSS-REFERENCE TO RELATED APPLICATION

The present application is based on PCT filing PCT/JP2020/021622, filed Jun. 1, 2020, the entire contents of which is incorporated herein by reference.

FIELD

The present invention relates to a SCADA web HMI system and an HMI client.

BACKGROUND

Supervisory Control And Data Acquisition (SCADA) is known as a mechanism that performs supervisory control of social infrastructure systems. The social infrastructure systems include a steel rolling system, a power transmission and transformation system, a water and sewage treatment system, a building management system, a road system, and the like.

The SCADA is a type of industrial control system that performs system monitoring and process control by computer. In the SCADA, a quick responsiveness (real-time property) in accordance with system processing performance is necessary.

The SCADA is usually composed of the following subsystems.
(1) Human Machine Interface (HMI)
An HMI is a mechanism that presents data of a target process (monitoring target device) to an operator and allows the operator to monitor and control the process. For example, in PTL 1, a SCADA HMI including an HMI screen which runs on a SCADA client is disclosed.
(2) Supervisory Control System
A supervisory control system is composed of a Programmable Logic Controller (PLC), and the like. The supervisory control system collects PLC data on a process and transmits a control command to the process.
(3) Remote Input/Output Device (Remote Input Output: RIO)
A remote input/output device, which is connected with a sensor installed within the process, converts a signal of the sensor into digital data and transmits the digital data to the supervisory control system.
(4) Communication Base
A communication base connects the supervisory control system and the remote input/output device.

CITATION LIST

Patent Literature

[PTL 1] JP 2017-27211 A

SUMMARY

Technical Problem

A client program of an HMI sub-system in PTL 1 is constructed by a program that depends on a machine environment. In order to achieve cost reduction in a SCADA HMI subsystem, the inventor of the present application finally has developed a browser-based SCADA HMI subsystem that does not depend on a machine environment.

When the SCADA HMI subsystem is constructed using a web application that runs on a web browser, the following advantages are provided:
(1) The web browser is installed in a lot of terminal devices such as a personal computer (PC) and a tablet PC and therefore, various terminal devices can be used for the SCADA HMI subsystem.
(2) The web browser has a highly functional rendering function, by which advanced GUI interaction functions including animation are easily built in.

The browser-based SCADA HMI subsystem includes a web HMI server and an HMI client.

The web HMI server receives PLC data from the supervisory control system. The PLC data is classified into data used as alarm data and data used as signal data. The alarm data is data changing at low frequency, which indicates an abnormality of a monitoring target device and is processed in a long period. The signal data is data changing at high frequency, such as the temperature and speed of the monitoring target device, and is processed in a short period.

The HMI client executes a web browser. The web browser receives alarm data and signal data from the web HMI server and displays a web page including these data.

In general, a web application running on the web browser updates a data structure called Document Object Model (DOM). The web browser executes rendering processing based on a result of updating the DOM. Therefore, the rendering processing of the web browser is slower than native display processing that performs display by directly using a display interface of the operating system.

By using the HTML 5 function, drawing can be performed at a high speed by using a rendering system such as WebGL. However, a display logic becomes complicated and therefore, it is difficult to perform all displays by using WebGL.

The alarm data is processed in a long period and a data transmission interval is long. Therefore, the web application can execute drawing processing of the alarm data without delay (FIG. 14). On the other hand, the signal data is processed in a short period and a data transmission interval is short. Therefore, when a large amount of signal data is transmitted, the web application may be unable to complete the drawing processing of these signal data within the transmission interval.

In addition, when DOM update processing is continuously executed to process a large amount of signal data, a timing for executing rendering processing by the web browser will be lost (FIG. 15). When the rendering processing fails to run, the signal data is not reflected on a physical screen. Therefore, display of the signal data on the physical screen will be delayed.

The present invention has been made in order to solve the above-mentioned problems. The object of the present invention is to provide a SCADA web HMI system and an HMI client that can prevent the delay of data display on a web browser even when receiving a large amount of signal data that exceeds the display performance of the HMI client.

Solution to Problem

In order to achieve the above object, a SCADA web HMI system according to the present invention is configured as follows.

The SCADA web HMI system includes a web HMI server and an HMI client. The web HMI server transmits signal data in which a unique identifier that specifies a display part related to a monitoring target and a signal value that is received from a programmable logic controller which is connected to the monitoring target are associated with each other. The HMI client displays, on a web browser, an HMI screen on which the display part is arranged. The HMI client receives the signal data from the web HMI server. The HMI client changes a display content of the display part corresponding to the received signal data.

The HMI client includes a memory, a processor, and a display. The memory stores a program and temporarily stores the signal data in a buffer area. The processor is configured to make a communication thread and a DOM update thread run in parallel on the web browser by executing the program. The display displays the web browser.

The communication thread executes reception processing, buffer overwrite processing, and buffer transmission processing. In the reception processing, the signal data is periodically received from the web HMI server. In the buffer overwrite processing, when a unique identifier included in the received signal data and a unique identifier included in signal data stored in the buffer area are the same, the signal data stored in the buffer area is overwritten with the received signal data. In the buffer transmission processing, when a signal data request event is received from the DOM update thread, a DOM update request event including all signal data stored in the buffer area is transmitted to the DOM update thread.

The DOM update thread executes DOM update processing and rendering processing. In the DOM update processing, when the DOM update request event is received, a DOM is updated for all the signal data included in the DOM update request event. The DOM update thread transmits, after updating the DOM, the signal data request event to the communication thread. In the rendering processing, a display content of the display part displayed on the web browser is updated according to the updated DOM.

Preferably, the communication thread further executes the following transmission processing and buffer processing. In the transmission processing, when processing in the DOM update thread is stopping, the DOM update request event including the received signal data is transmitted to the DOM update thread. In the buffer processing, when processing in the DOM update thread is being executed, the received signal data is stored in the buffer area. Here, the buffer overwrite processing is executed in the buffer processing.

Advantageous Effects of Invention

According to the present invention, the web browser makes the communication thread and the DOM update thread run in parallel. Therefore, the data reception processing and the drawing processing can be asynchronously executed.

The communication thread overwrites signal data having the same identifier in buffering received signal data and therefore, can thin out data so as to leave only the latest signal data. Thus, a buffer overflow can be prevented.

In addition, after the DOM update processing is complete, the DOM update thread transmits a signal data request event to the communication thread; and the communication thread receives this signal data request event and transmits the next signal data to the DOM update thread. According to this, in the DOM update thread, acquisition of the next signal data is inhibited until the DOM update processing is complete. Therefore, the DOM update processing is not executed continuously and the rendering processing can be executed each time the DOM update processing is complete.

Thus, according to the present invention, the display performance of the HMI client can be utilized to the maximum by appropriately executing the rendering processing while minimizing the amount of signal data to be thinned out. Therefore, according to the present invention, a delay in data display on the web browser can be prevented even when a large amount of signal data that exceeds the display performance of the HMI client is received.

BRIEF DESCRIPTION OF DRAWINGS

FIG. 4 is an example in which the data structure shown in FIG. 3 is expressed in JSON.

FIG. 9 is a diagram showing an example of storing data in a signal buffer.

DESCRIPTION OF EMBODIMENT

Hereinafter, an embodiment of the present invention will be described in detail with reference to drawings. However, when numbers such as the number, quantity, volume, or range of elements are referred to in the embodiment presented below, the present invention is not limited by the numbers referred to except where especially explicitly specified or where explicitly specified to the numbers in principle. In addition, structures and the like that are described in the embodiment presented below are not necessarily required for the present invention except where especially explicitly specified and where clearly specified thereto in principle.

First Embodiment

<Overall Configuration>

Figure 1:
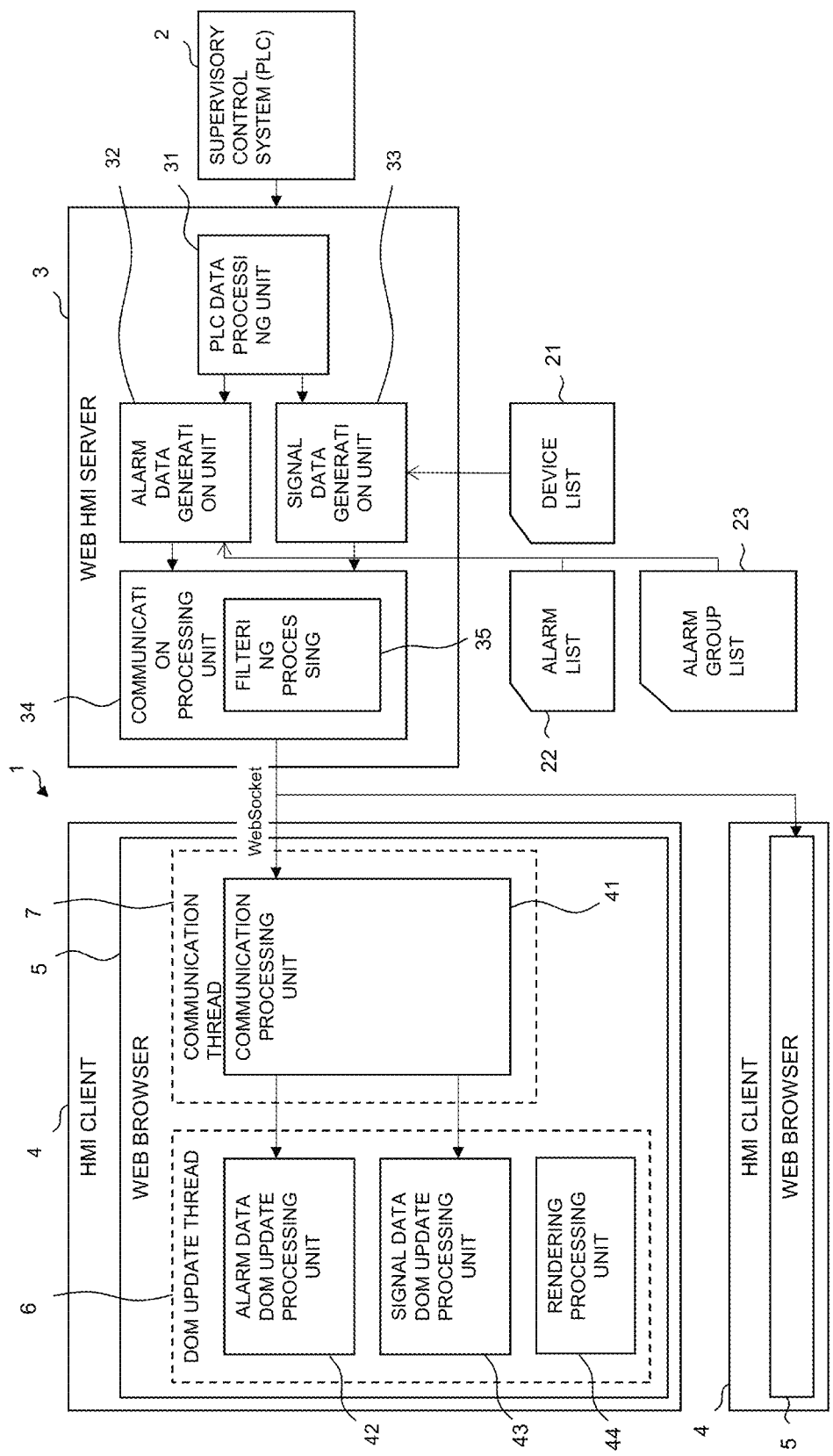
FIG. 1 is a block diagram for describing a system configuration of SCADA in a first embodiment of the present invention.

FIG. 1 is a block diagram for describing a system configuration of SCADA according to a first embodiment of the present invention.

The SCADA includes as subsystems: a human machine interface 1 (hereinafter, HMI 1) as a SCADA web HMI system; a programmable logic controller 2 (hereinafter, PLC 2) as a supervisory control system; a communication base (not illustrated); and a RIO (not illustrated). The SCADA connects to a monitoring target device (not illustrated) via the PLC 2 or the RIO.

Descriptions of the PLC 2, the communication base, and the RIO are as described in Background and therefore, are omitted. The monitoring target device is a device (including a sensor and an actuator) that constitutes a plant.

The HMI 1 includes a SCADA web HMI server device 3 (hereinafter, web HMI server 3) and at least one HMI client terminal 4 (hereinafter, HMI client 4).

The web HMI server 3 connects to the PLC 2 and the HMI client 4. The HMI client 4 executes a web browser 5. The web browser 5 displays an HMI screen. The HMI screen is configured by at least one drawing on which a display part indicating the state of the monitoring target device is arranged.

<Web HMI Server>

Figure 13:
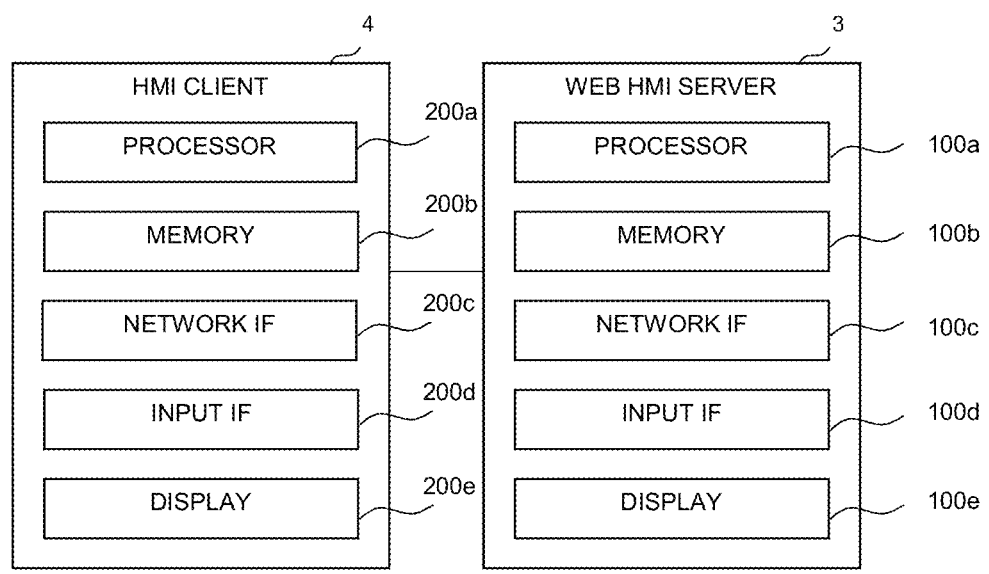
FIG. 13 is a block diagram showing examples of hardware configurations of a web HMI server and the HMI client.
Figure 14:
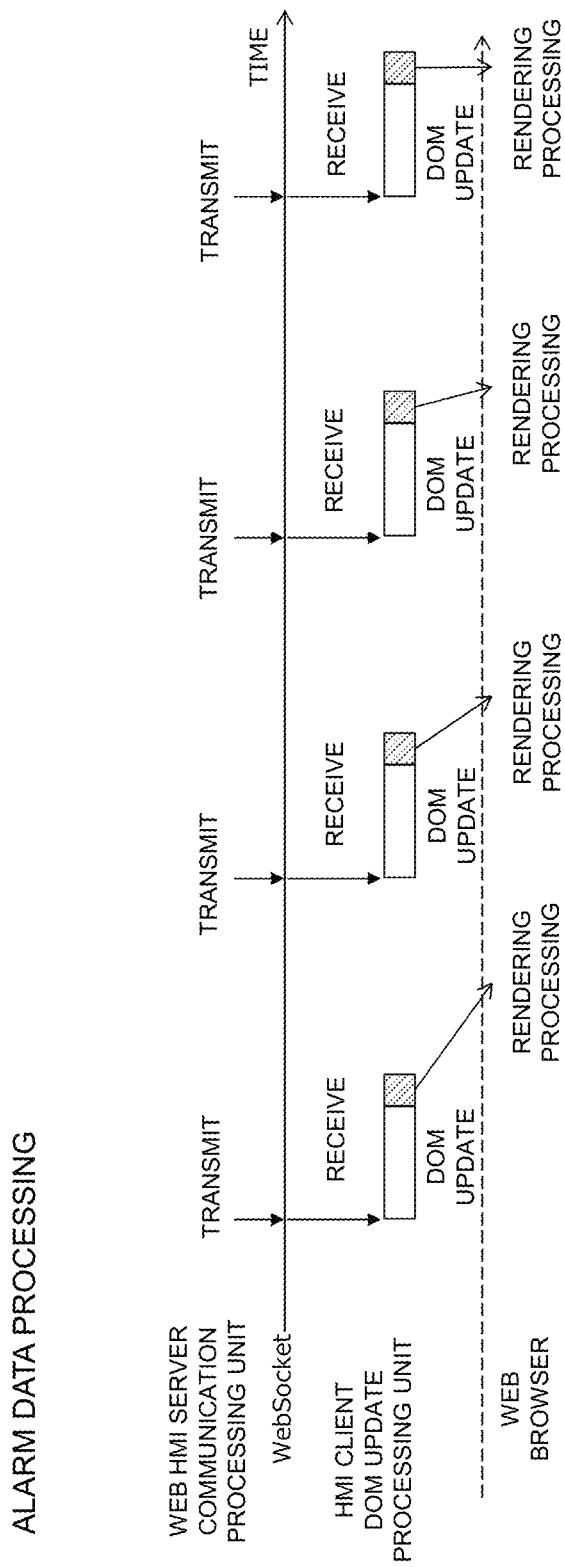
FIG. 14 is a diagram showing a processing example of alarm data in a related art.
Figure 15:
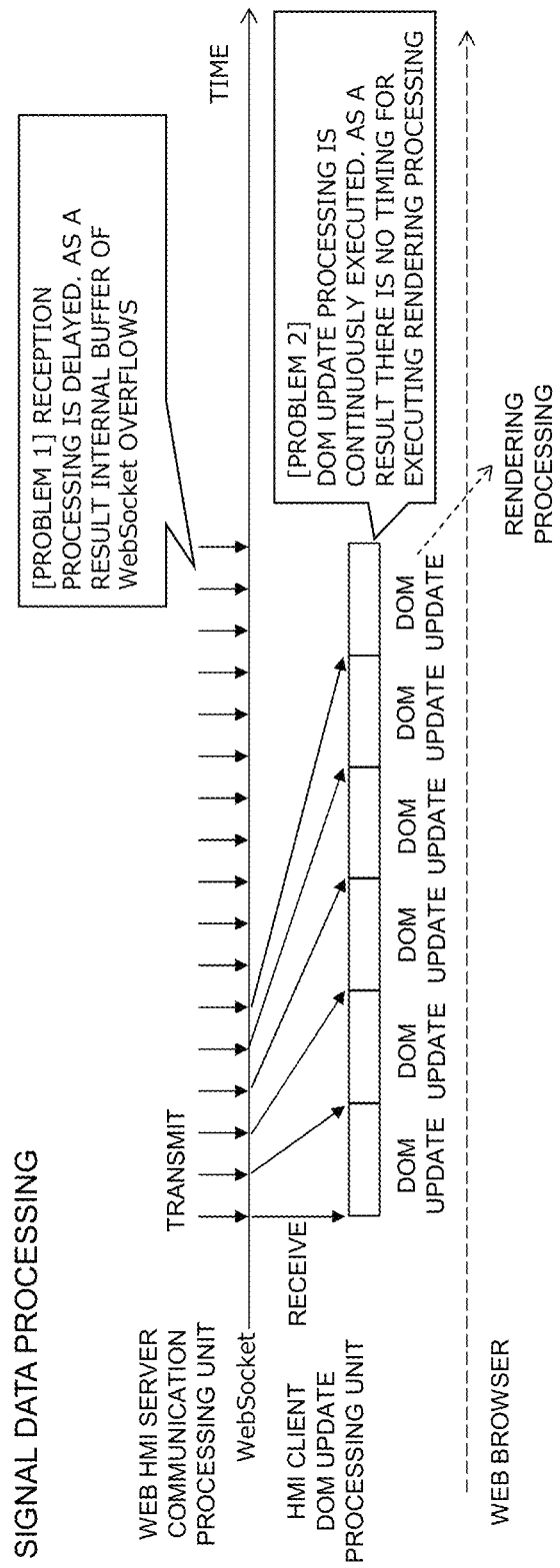
FIG. 15 is a diagram showing a processing example of signal data in a related art.

The web HMI server 3 includes a processor 100a and a memory 100b, as shown in FIG. 13 described later. The memory 100b stores a program that is executed by the processor 100a so as to make the processor 100a function as a web system. The web system includes a PLC data processing unit 31, an alarm data generation unit 32, a signal data generation unit 33, and a communication processing unit 34.

The PLC data processing unit 31 receives PLC data from the PLC 2. The PLC data includes a signal value which is input and output by the monitoring target device. The PLC data is classified into data used as the alarm data and data used as signal data. PLC data used as alarm data is transmitted to the alarm data generation unit 32. PLC data used as the signal data is transmitted to the signal data generation unit 33.

The alarm data generation unit 32 generates the alarm data from the received PLC data. More specifically, the alarm data generation unit 32 gives the received PLC data an alarm identifier according to an alarm type (severe trouble/moderate trouble/light trouble) and gives it alarm attributes such as an alarm state (occurred/recovered, unidentified/identified) and an alarm occurrence time, to generate the alarm data.

In addition, the alarm data generation unit 32 reads definition information (alarm list 22, alarm group list 23) in which an HMI client 4 that displays an alarm is defined for each alarm group. Based on the definition information, information on the HMI client 4 where an alarm is to be displayed is given to the alarm data.

The alarm data generation unit 32 transmits the generated alarm data to the communication processing unit 34.

Although there is a possibility that a large amount of the alarm data occurs at a time in connection with one trouble, a highly frequent change does not occur in a prescribed period of time. Therefore, the generation of the alarm data is performed in a long period. An interval for data transmission from the alarm data generation unit 32 to the communication processing unit 34 is, for example, about eight seconds.

The signal data generation unit 33 generates the signal data from the received PLC data. More specifically, the signal data generation unit 33, first, reads definition information (device list 21) for associating a unique identifier, which specifies a display part arranged on the HMI screen, with the PLC data. The unique identifier is an identifier that is unique within the system, which includes a combination of a graphic ID (drawing name) and a part ID (symbol name).

The signal data generation unit 33 generates the signal data in which the unique identifier that specifies the display part arranged on the HMI screen and a signal value of the PLC data are associated with each other. The signal data generation unit 33 transmits the generated signal data to the communication processing unit 34.

The signal data is data that changes at high frequency, such as the temperature and speed of the monitoring target device; and is required to be displayed on the screen of the HMI client 4 in real-time. Therefore, the signal data is processed in a shorter period as compared with the alarm data. An interval for data transmission from the signal data generation unit 33 to the communication processing unit 34 is about the same as an interval for PLC data communication from the PLC 2 to the PLC data processing unit 31. For example, it is about 50 ms.

The communication processing unit 34 transmits the received alarm data and signal data to the communication processing unit 41 of each HMI client 4 by using WebSocket communication. The communication processing unit 34 transmits only the data related to the each HMI client 4 by filtering processing 35.

Thus, the web HMI server 3 transmits, to the HMI client 4, the signal data in which a unique identifier that specifies a display part related to a monitoring target device and a signal value that is received from the PLC 2 connected to the monitoring target device are associated with each other.

<Hmi Client>

The HMI client 4 includes a processor 200a and a memory 200b, as shown in FIG. 13 described later. The memory 200b stores programs that are executed by the processor 200a so as to make the processor 200a function as the web browser 5 and make it function as a web application that runs on the web browser 5.

The HMI client 4 displays, on the web browser 5, an HMI screen on which a display part is arranged. The HMI client 4 receives the signal data from the web HMI server 3. The HMI client 4 changes, for a display part corresponding to a unique identifier of the received signal data, a display content of the display part according to a signal value of the received signal data.

The HMI client 4 makes, on the web browser 5, a DOM update thread 6 for event processing and drawing processing, and a communication thread 7 for communication processing run in parallel. Multithreading can be performed by Web Worker.

The web browser 5 can execute the communication processing unit 41, an alarm data DOM update processing unit 42, a signal data DOM update processing unit 43, and a rendering processing unit 44.

The communication processing unit 41, the alarm data DOM update processing unit 42, and the signal data DOM update processing unit 43 are implemented by a web application running on the web browser 5. This web application is written in JavaScript.

The rendering processing unit 44 is implemented by a renderer (rendering engine) provided in the web browser 5 beforehand.

The communication thread 7 executes processing of the communication processing unit 41.

The communication processing unit 41 periodically receives alarm data and signal data from the web HMI server 3 (reception processing). The signal data is received in a shorter period as compared with the alarm data. The communication processing unit 41 transmits the alarm data received from the web HMI server 3 to the alarm data DOM update processing unit 42. The communication processing unit 41 transmits the signal data received from the web HMI server 3 to the signal data DOM update processing unit 43.

The DOM update thread 6 execute the processing of the alarm data DOM update processing unit 42, the signal data DOM update processing unit 43, and the rendering processing unit 44.

Each of the alarm data DOM update processing unit 42 and the signal data DOM update processing unit 43 reflects the received data on a DOM. The rendering processing unit 44 displays, on the HMI screen, data that has been developed in the DOM.

Figure 2:
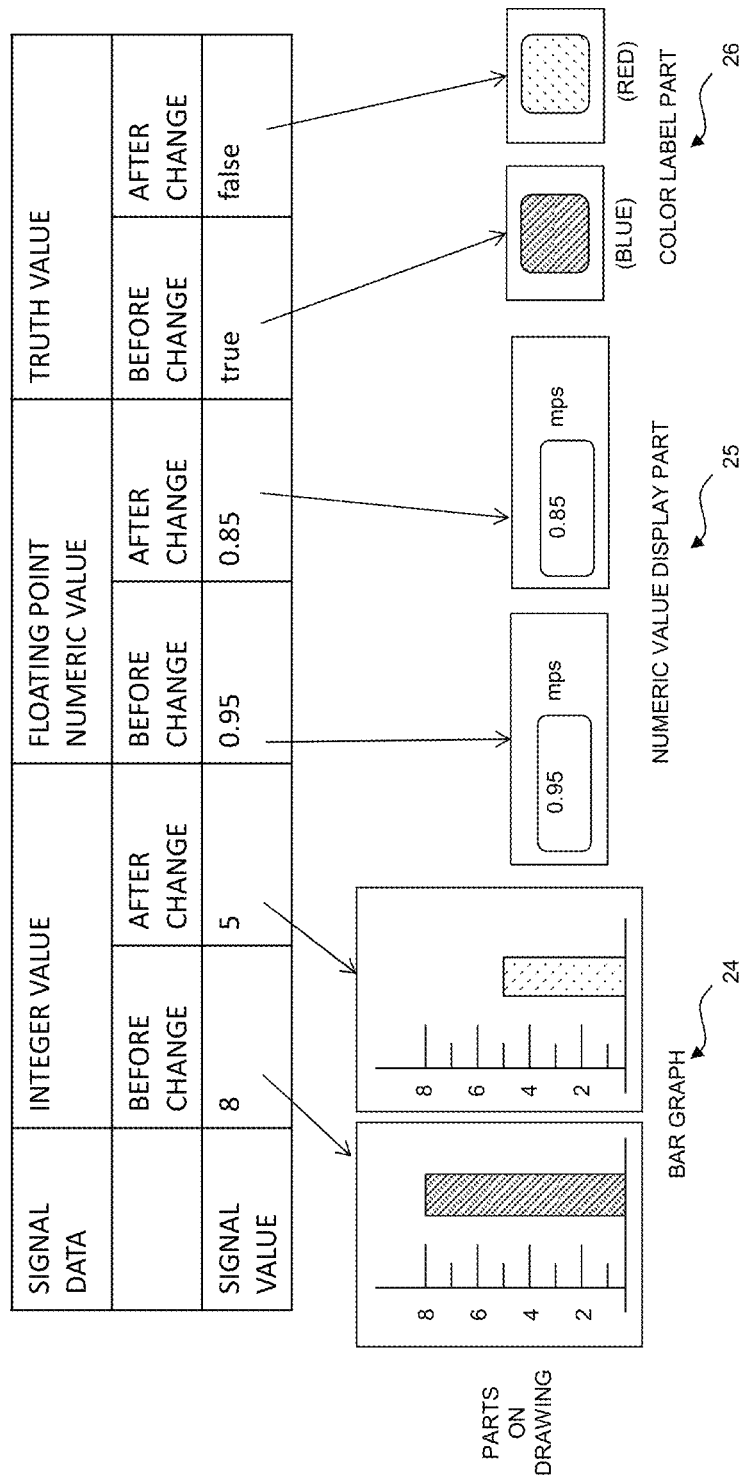
FIG. 2 is a diagram for describing a relationship between a display part displayed on a web browser and signal data.
Figure 3:
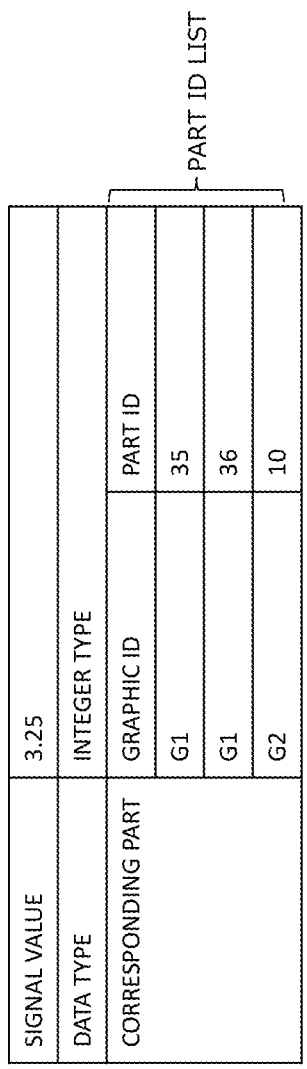
FIG. 3 is a diagram for describing an example of a data structure of signal data.

Next, the display part and the signal data will be elaborated upon with reference to FIG. 2 to FIG. 4.

FIG. 2 is a diagram for describing a relationship between the display part displayed on the web browser 5 and the signal data.

On a drawing displayed as a web page (HMI screen) on the web browser 5, a plurality of display parts (symbols) are arranged. The display parts include, for example, a bar graph 24, a numeric display part 25, and a color label part 26. The display parts are associated with signal data.

The data type of the signal data includes an integer type, a floating-point type, and a Boolean type. The bar graph 24 is a part with which integer type signal data is associated. In the bar graph 24, the length of a bar changes according to a signal value. The numeric display part 25 is a component with which floating-point type signal data is associated. In the numeric display part 25, the numeric of a text box changes according to a signal value. The color label part 26 is a component with which Boolean type signal data is associated. In the color label part 26, a color changes according to a signal value.

FIG. 3 is a diagram for describing an example of a data structure of signal data.

The signal data is assigned to a display part of each drawing. For each of the drawings constituting the HMI screen, a graphic ID is assigned. On the drawing, a plurality of display parts are arranged. For each of the display parts, a part ID is assigned. The signal data is data in which a unique identifier, which is obtained by combining a graphic ID and a part ID, and a signal value of PLC data are associated with each other.

As shown in FIG. 3, one signal value can be associated with a plurality of display parts. The signal data includes a list of unique identifiers each of which is obtained by combining a graphic ID and a part ID. This list is referred to as a part ID list. This data structure is made by the signal data generation unit 33 of the web HMI server 3.

Next, an example of expressing a data structure of signal data in a data description language will be described with reference to FIG. 4. As one of the data description languages, JavaScript Object Notation (JSON) is known. FIG. 4 is an example in which the data structure shown in FIG. 3 is expressed in JSON.

<Characteristic Configuration of HMI Client>

Next, the characteristic configuration of the HMI client 4 according to the embodiment will be described with reference to FIG. 5 to FIG. 12.

In the HMI client 4, the communication thread and the DOM update thread perform the processing described below so as to prevent the delay of signal data display on the web browser 5 even when a large amount of signal data is received.

As described in FIG. 1, the web browser 5 makes the communication thread 7 and the DOM update thread 6 run in parallel, thereby asynchronously executing data acquisition processing and drawing processing.

Figure 5:
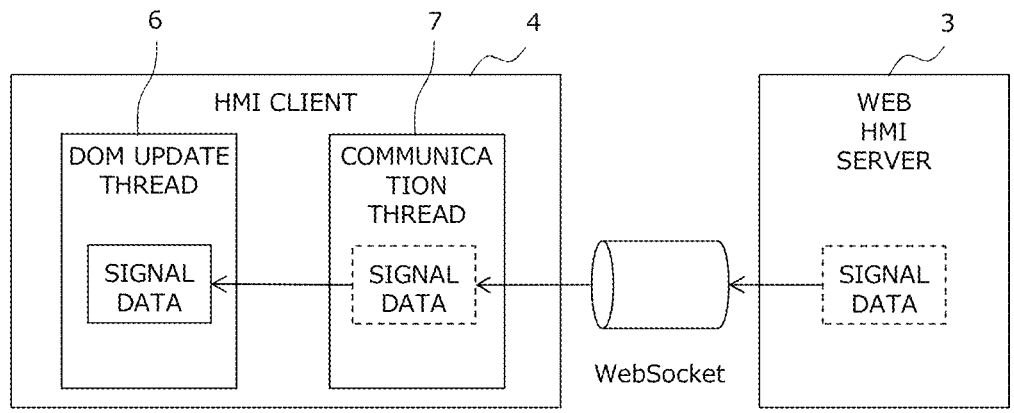
FIG. 5 is a diagram for describing processing when an HMI client 4 receives signal data during stopping of a DOM update thread.

FIG. 5 is a diagram for describing processing when the HMI client 4 receives signal data during stopping of the DOM update thread. When processing in the DOM update thread 6 is stopping, the communication thread 7 transmits a DOM update request event including the received signal data to the DOM update thread 6 (transmission processing).

Figure 6:
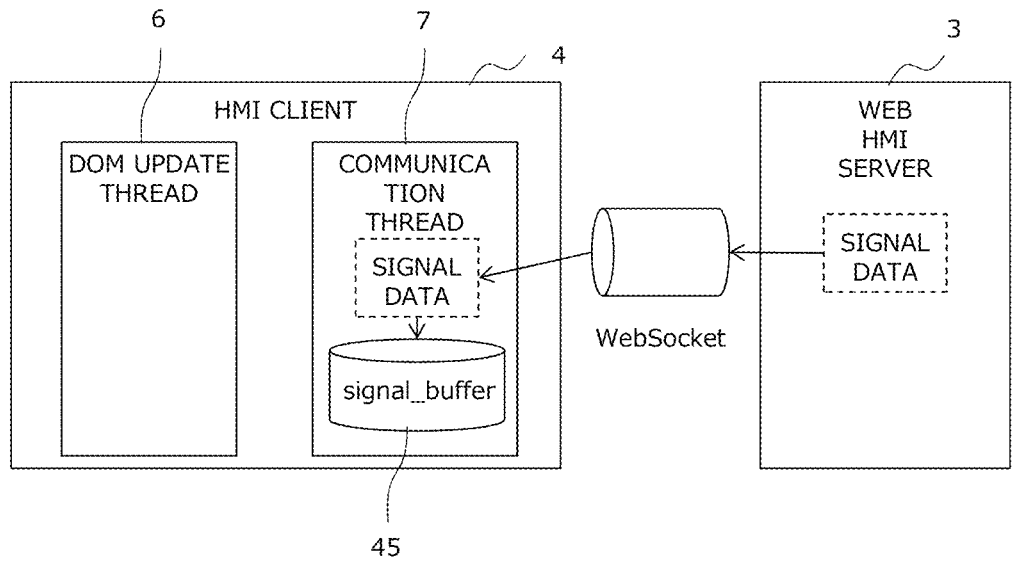
FIG. 6 is a diagram for describing processing when the HMI client 4 receives signal data during running of the DOM update thread.

FIG. 6 is a diagram for describing processing when the HMI client 4 receives signal data during running of the DOM update thread. The communication thread 7 stores (buffer processing), when processing in the DOM update thread 6 is being executed, the received signal data in a buffer area (signal buffer) which is reserved on the memory 200b of the HMI client 4.

Figure 7:
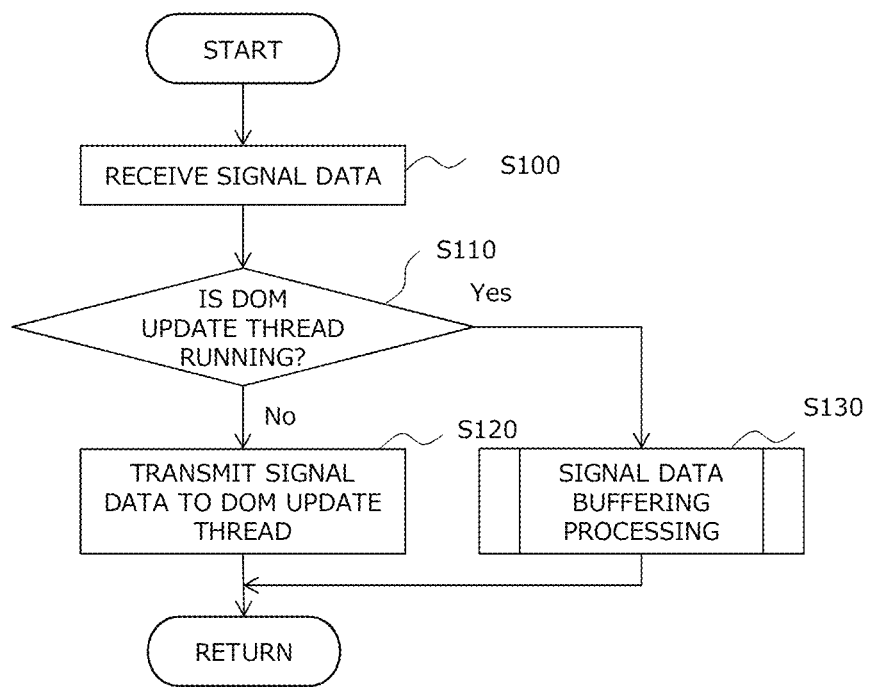
FIG. 7 is a flowchart showing signal data reception processing.

FIG. 7 is a flowchart showing signal data reception processing described in FIG. 5 and FIG. 6.

At step S100, the communication processing unit 41 receives signal data from the web HMI server 3.

At step S110, the communication processing unit 41 determines whether the DOM update thread 6 is running. The communication processing unit 41 executes processing of step S120 when the DOM update thread 6 is stopping. On the other hand, the communication processing unit 41 executes processing of step S130 when the DOM update thread 6 is running.

At step S120, the communication processing unit 41 transmits the received signal data to the DOM update thread 6 (transmission processing).

At step S130, the communication processing unit 41 executes signal data buffering processing (FIG. 8) as a subroutine (buffer processing).

After processing of step S120 or S130, the communication processing unit 41 ends the signal data reception processing.

Figure 8:
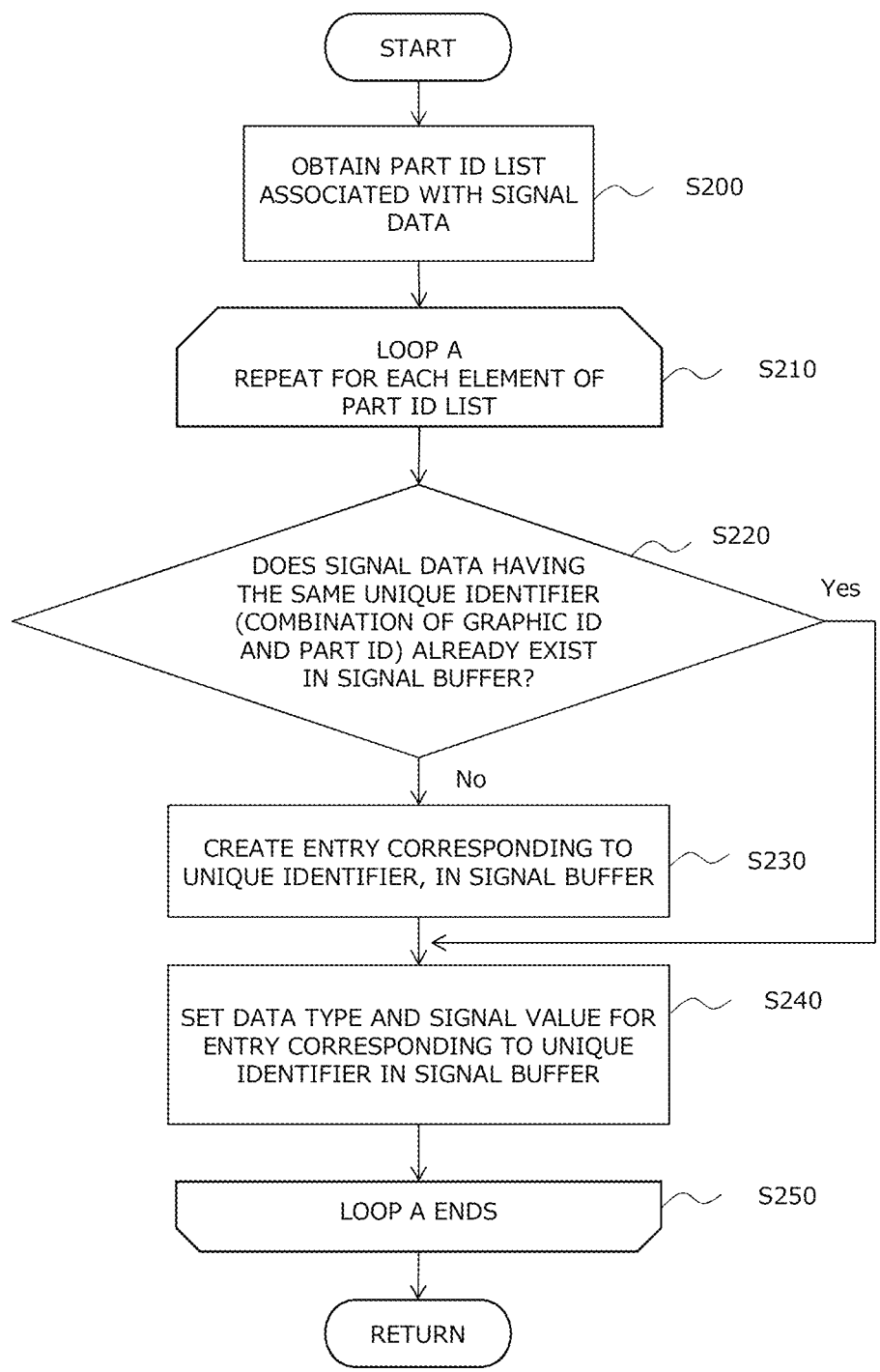
FIG. 8 is a flowchart for describing signal data buffering processing executed by a communication processing unit.

FIG. 8 is a flowchart for describing the signal data buffering processing executed by the communication processing unit 41 in step S130 in FIG. 7.

At step S200, the communication processing unit 41 obtains a part ID list associated with the signal data.

At step S210 to S250, the communication processing unit 41 executes processing of a loop A. The communication processing unit 41 executes processing of step S220 to step S240 for each element of the part ID list.

At step S220, the communication processing unit 41 determines whether signal data having the same unique identifier (combination of a graphic ID and a part ID) as the received signal data already exists in the signal buffer.

If the determination condition is not established at step S220, an advance to processing of step S230 is made.

On the other hand, if the determination condition is established at step S220, an advance to processing of step S240 is made.

At step S230, the communication processing unit 41 creates an entry corresponding to the unique identifier (combination of a graphic ID and a part ID) within the signal buffer. After that, an advance to processing of step S240 is made.

At step S240, the communication processing unit 41 sets a data type and a signal value in the entry corresponding to the unique identifier within the signal buffer.

The communication processing unit 41 executes processing of step S220 to step S240 for all the elements of the part ID list and then, ends the signal data buffering processing. Through the loop A, the signal data received from the web HMI server 3 is stored in the signal buffer as signal data divided for each unique identifier.

As described above, according to the processing in FIG. 8, when a unique identifier included in the received signal data and a unique identifier included in the signal data stored in the signal buffer are the same, the communication thread 7 overwrites the signal data stored in the signal buffer with the received signal data (buffer overwrite processing).

Next, an example in which processing in FIG. 7 and FIG. 8 is repeated and thereby, a plurality of pieces of signal data is stored in the signal buffer will be described with reference to FIG. 9.

FIG. 9 is a diagram showing an example of storing data in the signal buffer. According to processing shown in FIG. 8, when signal data on the signal buffer has the same unique identifier as the received signal data, its signal value is overwritten. The signal data before being overwritten is not used as data to be displayed on the HMI screen but is thinned out.

Signal data which is temporarily stored in the signal buffer by the above-described signal data buffering processing is transmitted to the DOM update thread 6 in response to a request from the DOM update thread 6.

Figure 10:
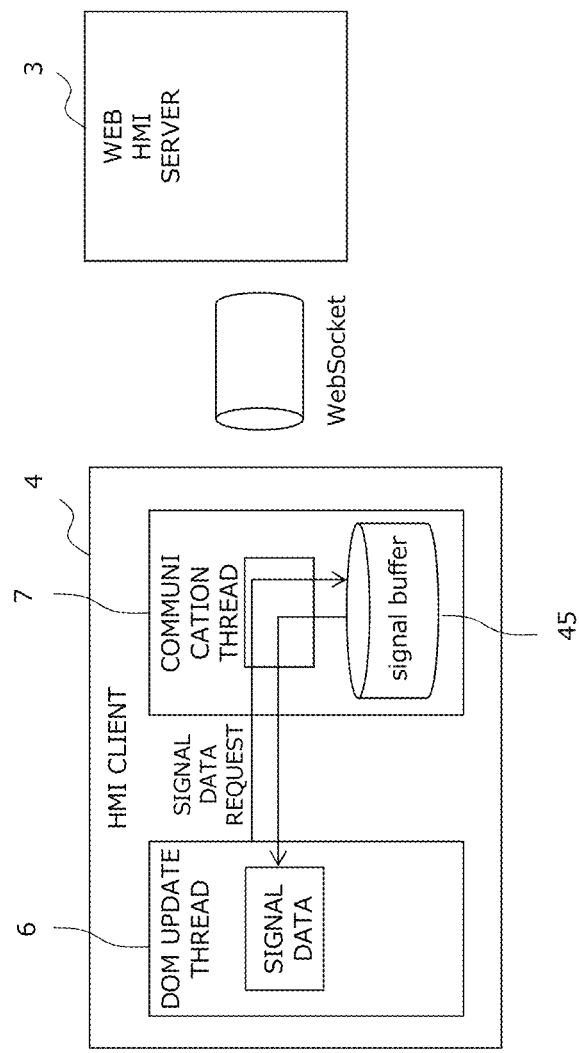
FIG. 10 is a diagram for describing processing of the DOM update thread obtaining signal data which is temporarily stored in a signal buffer.

FIG. 10 is a diagram for describing processing of the DOM update thread 6 obtaining the signal data which is temporarily stored in the signal buffer.

After completing DOM update processing for current signal data, the DOM update thread 6 calls the communication thread 7 and requests it to transmit the signal data which is temporarily stored in the signal buffer. More specifically, it transmits a signal data request event to the communication thread 7.

When receiving the signal data request event from the DOM update thread 6, the communication thread 7 transmits a DOM update request event including all the signal data stored in the signal buffer to the DOM update thread 6 (buffer transmission processing). After transmission, the communication thread 7 deletes the data temporarily stored in the signal buffer.

When receiving the DOM update request event, the DOM update thread 6 updates the DOM for all the signal data included in the DOM update request event (DOM update processing).

Figure 11:
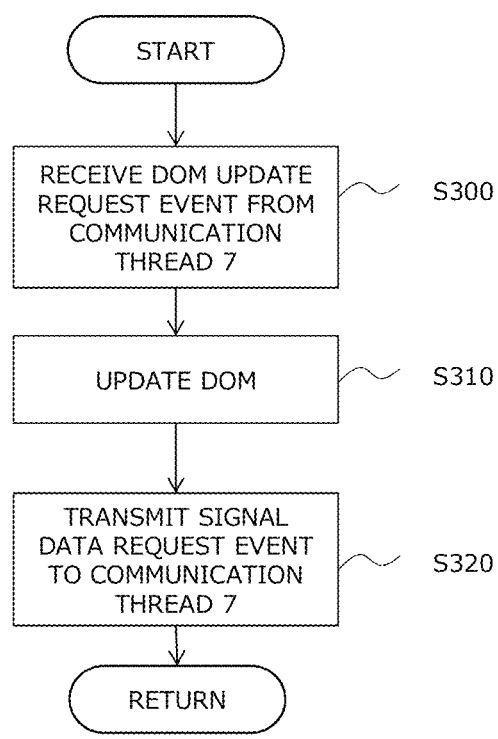
FIG. 11 is a flowchart for describing processing of the DOM update thread.

FIG. 11 is a flowchart for describing processing of the DOM update thread 6.

At step S300, the signal data DOM update processing unit 43 receives a DOM update request event from the communication thread.

At step S310, the signal data DOM update processing unit 43 updates the DOM for all the signal data included in the DOM update request event.

At step S320, the signal data DOM update processing unit 43 transmits a signal data request event to the communication thread 7.

Figure 12:
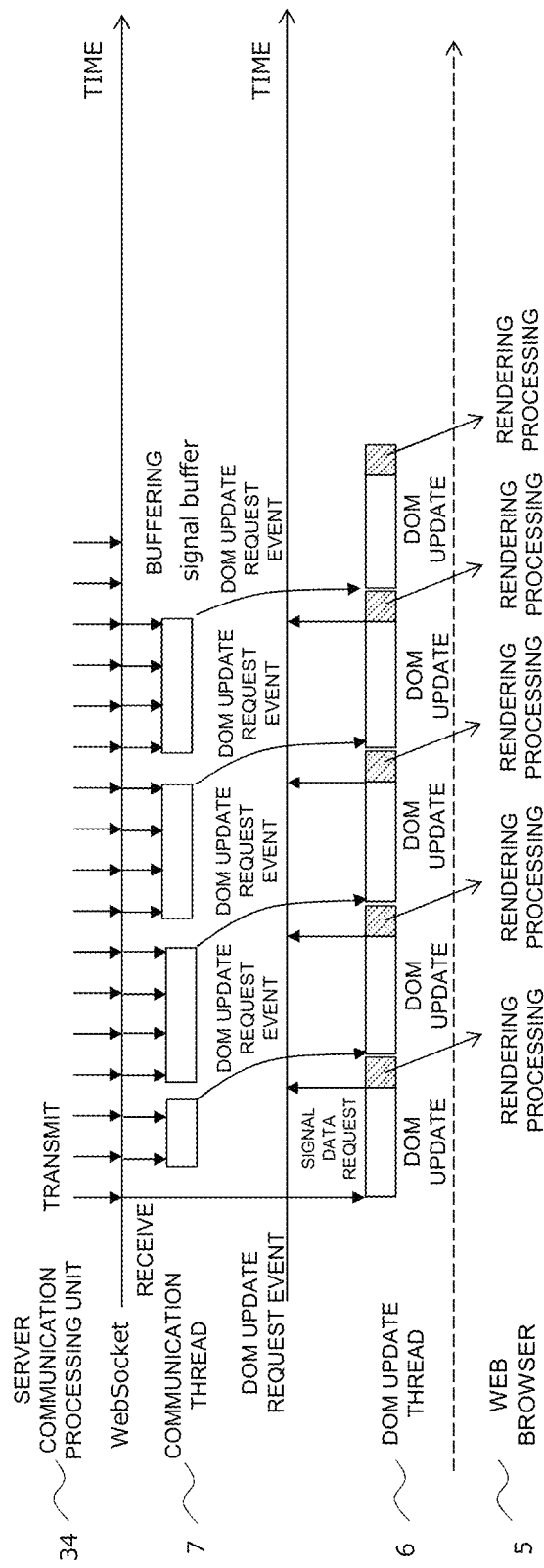
FIG. 12 is a diagram for describing a timing for the DOM update thread requesting signal data and a timing for rendering processing.

FIG. 12 is a diagram for describing a timing for the DOM update thread 6 requesting the signal data and a timing for rendering processing.

It is important in this system that after completing a DOM update, the DOM update thread 6 calls the communication thread 7 so as to request the buffered next signal data (signal data request event).

At a timing for transmitting the signal data request event, the DOM update thread 6 executes rendering processing. The rendering processing is processing of reflecting, on a physical screen, data which has been developed on the DOM. The rendering processing unit 44 updates the display contents of display parts displayed on the web browser 5 according to the updated DOM.

As described above, according to the SCADA web HMI system according to the present embodiment, the communication thread 7 overwrites the signal data having the same identifier in buffering received signal data and therefore, can thin out data so as to leave only the latest signal data. Thus, a buffer overflow can be prevented.

In addition, after the DOM update processing is complete, the DOM update thread 6 transmits a signal data request event to the communication thread 7; and the communication thread 7 receives this signal data request event and transmits the next signal data to the DOM update thread 6. According to this, in the DOM update thread 6, acquisition of the next signal data is inhibited until the DOM update processing is complete. Therefore, the DOM update processing is not executed continuously and the rendering processing can be executed each time the DOM update processing is complete.

Thus, according to the embodiment, the display performance of the HMI client 4 can be utilized to the maximum by appropriately executing the rendering processing while minimizing the amount of signal data to be thinned out. Therefore, according to the present invention, a delay in data display on the web browser 5 can be prevented even when a large amount of signal data that exceeds the display performance of the HMI client 4 is received.

Although the above description has been made mainly on the signal data, the alarm data can also be processed in the same manner. Processing for the signal data in the DOM update thread 6 and the communication thread 7 is also applied to the alarm data. Processing similar to that of the signal data DOM update processing unit 43 is also applied to the alarm data DOM update processing unit 42.

In addition, in the above-described first embodiment, the memory 200*b* may be configured to: include a main memory and a buffer memory as a buffer area; store a program in the main memory; and store the signal data in the buffer memory.

<Hardware Configuration Example>

FIG. 13 is a block diagram showing hardware configuration examples of the web HMI server 3 and the HMI client 4.

Each processing of the web HMI server 3, which is described above, is implemented by a processing circuit. The processing circuit is constituted by connecting at least one processor 100*a*, at least one memory 100*b*, a network interface 100*c*, an input interface 100*d*, and at least one display 100*e*. The processor 100*a* executes various programs stored in the memory 100*b* and thereby implements functions of the web HMI server 3. The memory 100*b* includes ROM, RAM, an HDD, and an SSD. The network interface 100*c* is a device connected with the PLC 2 via a computer network and capable of receiving PLC data. The network interface 100*c* is a device connected with the HMI client 4 and capable of transmitting the alarm data and the signal data. The input interface 100*d* is an input device such as a keyboard, a mouse, or a touch panel.

Each processing of the HMI client 4, which is described above, is implemented by a processing circuit. The processing circuit is constituted by connecting at least one processor 200*a*, at least one memory 200*b*, a network interface 200*c*, an input interface 200*d*, and at least one display 200*e*. The processor 200*a* executes various programs stored in the memory 200*b* and thereby implements functions of the HMI client 4. The memory 200*b* includes ROM, RAM, an HDD, and an SSD. The network interface 200*c* is a device connected with the web HMI server 3 via a computer network and capable of receiving the alarm data and the signal data. The input interface 200*d* is an input device such as a keyboard, a mouse, or a touch panel. Note that the HMI client 4 may be a portable terminal such as a tablet. The display 200*e* displays the web browser 5.

Although the embodiment according to the present invention has been described above, the present invention is not limited to the above embodiment and various modification can be made without departing from the spirit of the present invention.

REFERENCE SIGNS LIST

1 Human machine interface (HMI)
2 Programmable logic controller (PLC)
3 SCADA web HMI server device (web HMI server)
4 HMI client terminal (HMI client)
5 Web browser
6 DOM update thread
7 communication thread
21 Device list
22 Alarm list
23 Alarm group list
24 Bar graph
25 Numeric display part
26 Color label part
31 PLC data processing unit
32 Alarm data generation unit
33 Signal data generation unit
34 Communication processing unit
35 Filtering processing
41 Communication processing unit
42 Alarm data DOM update processing unit
43 Signal data DOM update processing unit
44 Rendering processing unit
100*a* Processor
100*b* Memory
100*c* Network interface
100*d* Input interface
100*e* Display
200*a* Processor
200*b* Memory
200*c* Network interface
200*d* Input interface
200*e* Display

The invention claimed is:

1. A SCADA web HMI system, comprising:
a web HMI server that transmits signal data, a unique identifier and a signal value being associated with each other in the signal data, the unique identifier specifying a display part related to a monitoring target, the signal value being received from a programmable logic controller connected to the monitoring target; and
an HMI client that displays an HMI screen on a web browser, the display part being arranged on the HMI screen, receives the signal data from the web HMI server, and changes a display content of the display part corresponding to the received signal data;
wherein
the HMI client includes:
  a memory that stores a program and temporarily stores the signal data in a buffer area;
  a processor that is configured to make a communication thread and a DOM update thread run in parallel on the web browser by executing the program; and
  a display that displays the web browser;
the communication thread executes:
  reception processing of periodically receiving the signal data from the web HMI server;
  buffer overwrite processing of overwriting signal data stored in the buffer area with the received signal data when a unique identifier included in the received signal data and a unique identifier included in the signal data stored in the buffer area are the same; and
  buffer transmission processing of transmitting a DOM update request event to the DOM update thread when receiving a signal data request event from the DOM update thread, the DOM update request event including all signal data stored in the buffer area; and
the DOM update thread executes:
  DOM update processing of updating a DOM for all the signal data included in the DOM update request event when receiving the DOM update request event; and
  after updating the DOM, rendering processing of transmitting the signal data request event to the communication thread and updating, according to the updated DOM, a display content of the display part displayed on the web browser.

2. The SCADA web HMI system according to claim 1, wherein
the communication thread executes:
  transmission processing of transmitting the DOM update request event including the received signal data to the DOM update thread when processing in the DOM update thread is stopping; and
  buffer processing of storing the received signal data in the buffer area when processing in the DOM update thread is running; and
the buffer overwrite processing is executed in the buffer processing.

3. An HMI client, wherein
the HMI client displays an HMI screen on a web browser, a display part related to a monitoring target being arranged on the HMI screen, receives signal data, a unique identifier and a signal value being associated with each other in the signal data, the unique identifier specifying the display part, the signal value being related to the monitoring target, and changes a display content of the display part corresponding to the received signal data; and
the HMI client comprises:
  a memory that stores a program and temporarily stores the signal data in a buffer area;
  a processor that is configured to make a communication thread and a DOM update thread run in parallel on the web browser by executing the program; and
  a display that displays the web browser;
the communication thread executes:
  reception processing of periodically receiving the signal data from the web HMI server;
  buffer overwrite processing of overwriting signal data stored in the buffer area with the received signal data when a unique identifier included in the received signal data and a unique identifier included in the signal data stored in the buffer area are the same; and
  buffer transmission processing of transmitting a DOM update request event to the DOM update thread when receiving a signal data request event from the DOM update thread, the DOM update request event including all signal data stored in the buffer area; and the DOM update thread executes:
   DOM update processing of updating a DOM for all the signal data included in the DOM update request event when receiving the DOM update request event; and
   after updating the DOM, rendering processing of transmitting the signal data request event to the communication thread and updating, according to the updated DOM, a display content of the display part displayed on the web browser.

4. The HMI client according to claim 3, wherein
the communication thread executes:
   transmission processing of transmitting the DOM update request event including the received signal data to the DOM update thread when processing in the DOM update thread is stopping; and
   buffer processing of storing the received signal data in the buffer area when processing in the DOM update thread is running; and
the buffer overwrite processing is executed in the buffer processing.

\* \* \* \* \*